United States Patent [19]

Hoffmann et al.

[11] Patent Number: 4,776,449

[45] Date of Patent: Oct. 11, 1988

[54] STACKER WITH CONNECTING CONVEYOR

[75] Inventors: Dieter Hoffmann, Lübeck; Alfred Häusler, Bad Schwartau; Karl-Heinz Bohse, Lübeck; Reinhard Trümper, Stockelsdorf, all of Fed. Rep. of Germany

[73] Assignee: O&K Orenstein & Koppel Aktiengesellschaft, Berlin, Fed. Rep. of Germany

[21] Appl. No.: 47,691

[22] Filed: May 7, 1987

[30] Foreign Application Priority Data

May 20, 1986 [DE] Fed. Rep. of Germany ....... 3616485

[51] Int. Cl.[4] .............................................. B65G 65/28
[52] U.S. Cl. .................................... 198/508; 198/584
[58] Field of Search ............... 198/303, 311, 508, 585, 198/588, 589, 594, 584; 414/133

[56] References Cited

U.S. PATENT DOCUMENTS 2,632,558  3/1953  Mercier .............................. 414/133
4,406,361  9/1983  Konigs et al. ........................ 198/588

FOREIGN PATENT DOCUMENTS 740232   5/1943  Fed. Rep. of Germany .
241058  11/1986  Fed. Rep. of Germany ...... 198/588
898718   6/1962  United Kingdom ................ 198/508

Primary Examiner—Joseph E. Valenza
Attorney, Agent, or Firm—Toren, McGeady & Associates

[57] ABSTRACT

A stacker with a connecting conveyor for connecting the stacker with a conveying unit includes a roller rocker which is movably attached to the connecting conveyor and can be placed on the conveying unit or on a traveling vehicle. The roller rocker is placed on the conveying unit or the traveling vehicle in such a way that the connection permits three degrees of freedom.

3 Claims, 2 Drawing Sheets

STACKER WITH CONNECTING CONVEYOR

BACKGROUND OF THE INVENTION

1. Field of the Invention

The present invention relates to a stacker with a connecting conveyor which connects the stacker with a conveying unit which delivers the material to be conveyed.

2. Description of the Prior Art

Stackers with connecting conveyors are known. The connecting conveyors provide the connection between the stacker and another conveying unit. This conveying unit may be a tripper car or a bucket wheel excavator or another large conveying unit, such as, a transporter bridge or the like.

It is known in the art to support this connecting conveyor on the other conveying unit by means of a roller rocker which is movable toward all sides. Thus, the two units connected by the connecting conveyor can be moved relative to each other to a certain extent.

It is further known in the art to provide the stacker with a connecting conveyor whose free end is supported by means of a roller rocker on a separate crawler-type vehicle. In that case, the end of the connecting conveyor projects underneath the transfer point of the delivering conveying unit.

It is, therefore, the primary object of the present invention to provide a stacker with a connecting conveyor in which it is possible in a simple manner to select between a support for the connecting conveyor by the delivering conveying unit and a support for the connecting conveyor by a crawler-type vehicle. The structural weight of such a unit is to be as small as possible. In addition, it should be possible without difficulties to effect a switch between the two types of support of the connecting conveyor.

SUMMARY OF THE INVENTION

In accordance with the present invention, a stacker with a connecting conveyor for conveying the stacker with a conveying unit includes a crawler rocker which is attached to the connecting converter so as to be movable in longitudinal direction of the connecting conveyor, wherein the roller rocker is movable on the connecting conveyor between a first position and a second position. In the first position, the roller rocker rests on the conveying unit and, in the second position, the roller rocker rests on a traveling vehicle. The roller rocker is seated on the conveying unit or the traveling vehicle in such a way that the connection between the roller rocker and the connecting conveyor or the traveling vehicle permits three degrees of freedom.

The stacker with connecting conveyor according to the present invention has the advantage that only a single roller rocker is required. This roller rocker is seated with three degrees of freedom on the delivering conveying unit, such as, a tripper car, or a traveling vehicle, such as, a crawler-type implement.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 3 is a sectional view of a ball-type support for the connecting conveyor.

DETAILED DESCRIPTION OF THE INVENTION

Figure 1:
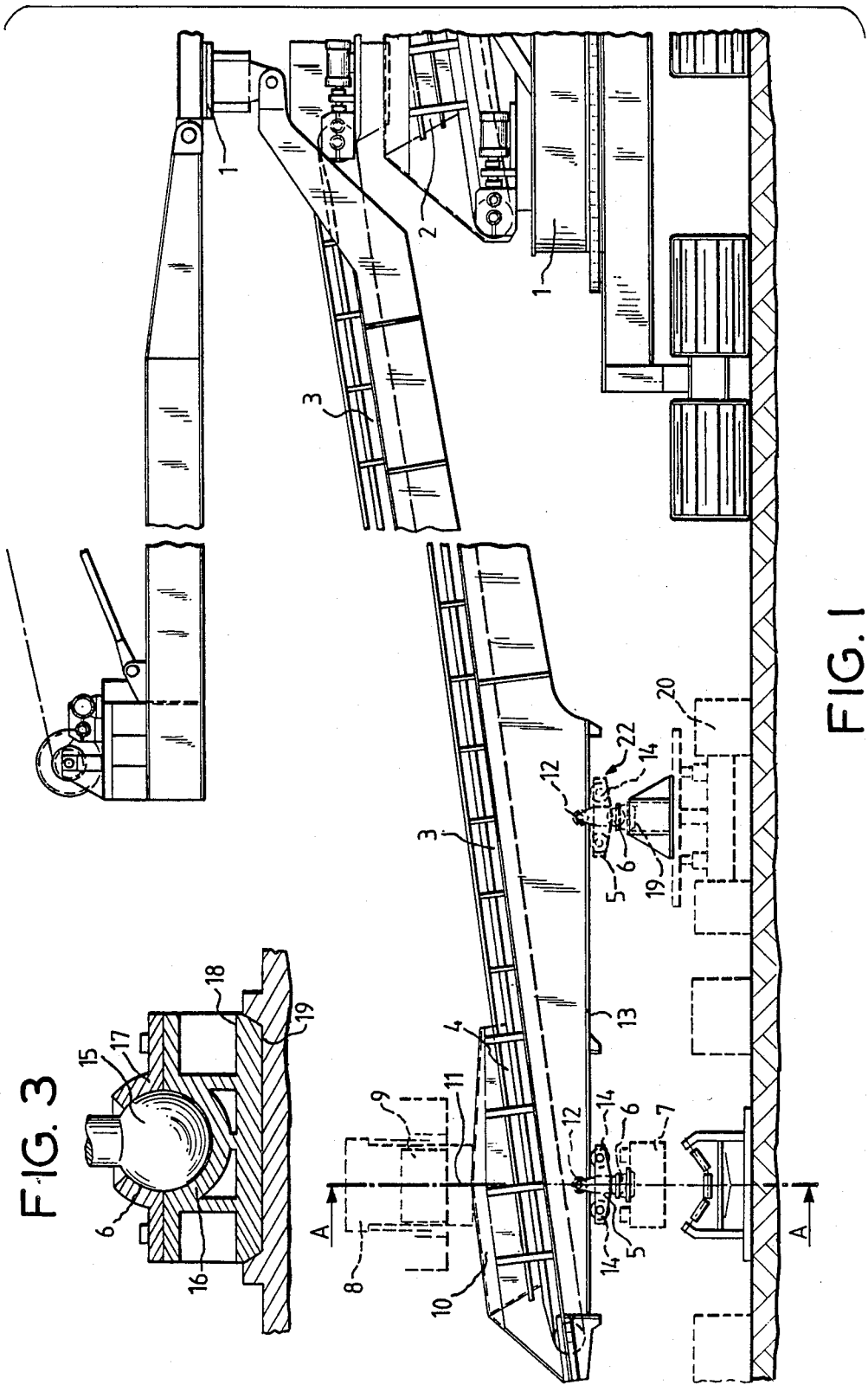
FIG. 1 is an elevational rear view of a stacker with a connecting conveyor, and a tripper car connected to the connecting conveyor.
Figure 2:
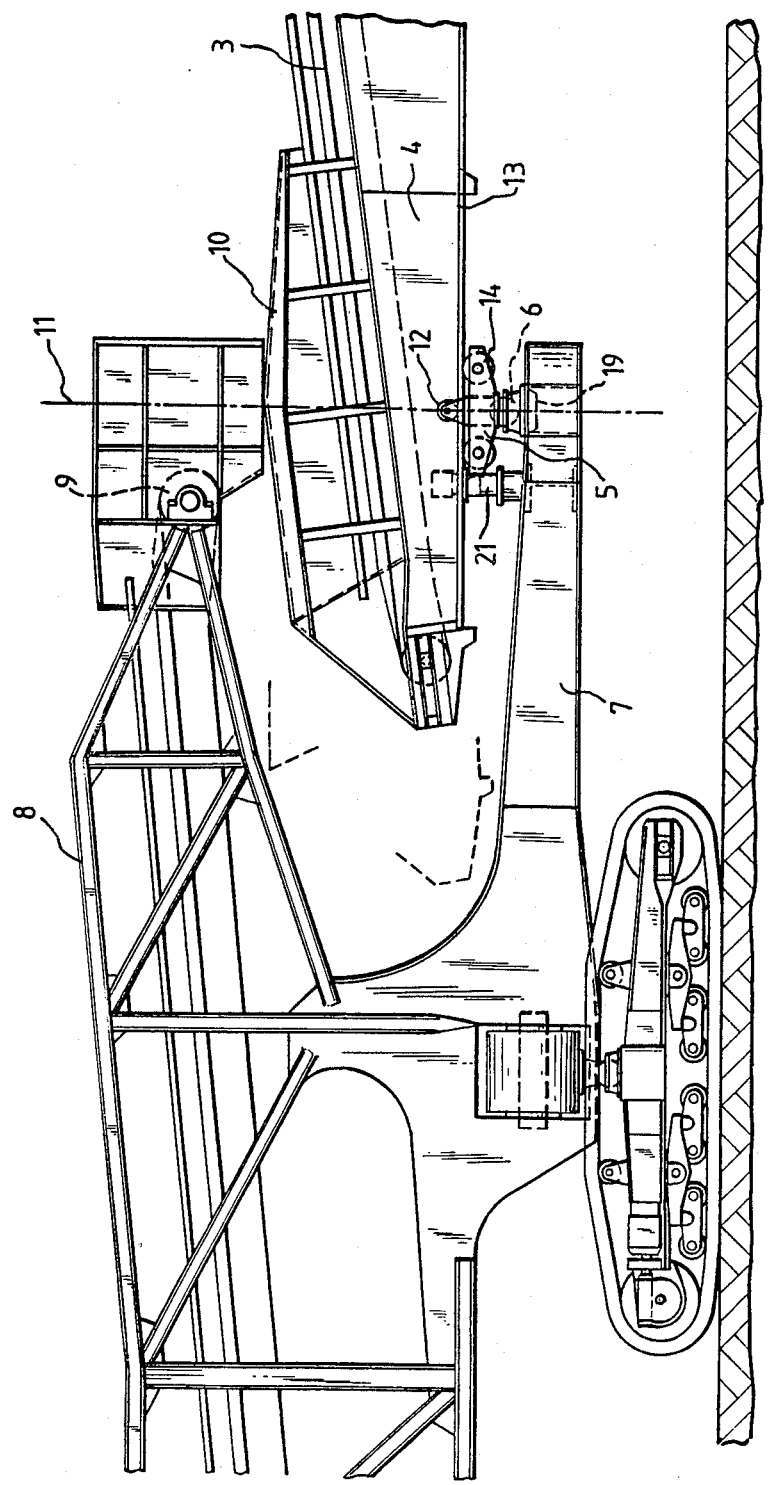
FIG. 2 is a sectional view taken along sectional line A—A of FIG. 1, however, the connecting conveyor has been turned by 90° relative to the position illustrated in FIG. 1.

As illustrated in FIG. 1, the stacker according to the invention includes a superstructure 1 which is swivel mounted on a crawler unit. The forward end of a connecting conveyor 3 ends above a transfer chute 2 of the stacker. Connecting conveyor 3 is also swivel mounted in the stacker.

The feed end 4 of the connecting conveyor 3 is mounted on a support member 7 of tripper car 8 by means of a roller rocker 5 including a ball-type support 6. A discharge drum roller 9 of the tripper car 8 dumps the material into a chute 10 which is located approximately in the swivel axis 11 of roller rocker 5.

Roller rocker 5 has at its upper side support rollers 12 by means of which roller rocker 5 is movably mounted in a track 13 at the feed end 4 of connecting conveyor 3. Instead of the illustrated support of the roller rocker 5 by means of support rollers 12, roller rocker 5 can also be mounted in a different manner so as to be movable at the feed end 4 of connecting conveyor 3.

As illustrated in the drawing roller rocker 5 includes two additional support rollers 14 which serve to support connecting conveyor 3.

Several different embodiments of ball-type support 6 of the roller rocker 5 are possible. In accordance with one embodiment, the ball of the ball-type support 6 is removable from its socket. In the embodiment illustrated in FIG. 3, the ball is supported in a spherical socket so as to be secured against lifting.

Specifically, the ball-type support 6 includes a ball 15 which is placed in a spherical socket 16 in the known manner. The upper portion of spherical socket 16 defines a member 17 for preventing lifting the ball from the socket. The remainder of the socket is part of a separate cup-like structural component 18. Component 18 may be lowered into a corresponding recess 19 formed in support member 7.

A crawler-type vehicle 20 is capable of traveling between the stacker and the tripper car 8. The upper portion of vehicle 20 is shaped in the same manner as support member 7, so that it can receive ball-type support 6. As can be seen in FIG. 3 on a larger scale, vehicle 20 has a top portion with a recess 19 for receiving cup-like portion 18.

The ball-type support 6 can be raised out of the recesses 19 of vehicle 20 or support member 7.

A lifting cylinder 21 is mounted on support member 7 in order to facilitate the movement of the roller rocker 5. In order to move roller rocker 5 from the position illustrated in FIG. 1, lifting cylinder 21 raises the rearward end of connecting conveyor 3. Roller rocker 5 can now be moved from the position shown in solid lines on the left to the position shown in broken lines on the right, as seen in FIG. 1. Subsequently, the connecting conveyor 3 is lowered again until ball-type support 6 rests on vehicle 20.

Accordingly, only a single roller rocker is required for changing the connecting conveyor of a stacker from one type of use to another. This changeover can be carried out by unskilled personnel.

While a specific embodiment of the invention has been shown and described in detail to illustrate the application of the inventive principles, it will be understood that the invention may be embodied otherwise without departing from such principles.

We claim:

1. A stacker including a connecting conveyor for connecting the stacker with a conveying unit, comprising a roller rocker movably attached to the connecting conveyor so as to be movable in longitudinal direction of the connecting conveyor, the roller rocker movable on the connecting conveyor between a first position and a second position, the roller rocker in the first position resting on the conveying unit and in a second position resting on a traveling vehicle, such that the roller rocker is seated on the conveying unit in the first position or the traveling vehicle in the second position so as to permit three degrees of freedom.

2. The stacker according to claim 1, wherein the roller rocker includes a ball-type support, the ball-type support including a ball and a socket, the socket having an upper portion for preventing lifting of the ball and a removable lower portion for seating the ball.

3. The stacker according to claim 1, comprising a lifting cylinder attached to the conveying unit for lifting the connecting conveyor.

* * * * *